US006565235B2

(12) United States Patent
Li

(10) Patent No.: US 6,565,235 B2
(45) Date of Patent: May 20, 2003

(54) FOLDING AN ARC INTO ITSELF TO INCREASE THE BRIGHTNESS OF AN ARC LAMP

(75) Inventor: Kenneth K. Li, Arcadia, CA (US)

(73) Assignee: Cogent Light Technologies Inc., Santa Clarita, CA (US)

(*) Notice: Subject to any disclaimer, the term of this patent is extended or adjusted under 35 U.S.C. 154(b) by 0 days.

(21) Appl. No.: 09/983,213

(22) Filed: Oct. 23, 2001

(65) Prior Publication Data

US 2002/0051362 A1 May 2, 2002

Related U.S. Application Data

(60) Provisional application No. 60/243,280, filed on Oct. 26, 2000.

(51) Int. Cl.⁷ ................................................ F21V 8/00
(52) U.S. Cl. ........................................ 362/304; 362/305
(58) Field of Search .................................. 362/304, 305

(56) References Cited

U.S. PATENT DOCUMENTS

| 3,986,767 A | 10/1976 | Rexer et al. |
| 4,357,075 A | 11/1982 | Hunter |
| 4,473,295 A | 9/1984 | Doyle |
| 4,519,266 A | 5/1985 | Reinecke |
| 4,608,622 A | 8/1986 | Gonser |
| 4,634,276 A | 1/1987 | Sharpe |
| 4,757,431 A | 7/1988 | Cross et al. |
| RE32,912 E | 4/1989 | Doyle |
| 4,957,759 A | 9/1990 | Swartzel et al. |
| 5,191,393 A | 3/1993 | Hignette et al. |
| 5,414,600 A | 5/1995 | Strobl et al. |
| 5,430,634 A | 7/1995 | Baker et al. |
| 5,707,131 A * | 1/1998 | Li .............................. 362/241 |
| 5,777,809 A | 7/1998 | Yamamoto et al. |
| 5,900,973 A | 5/1999 | Marcellin-Dibon et al. |
| 5,986,792 A | 11/1999 | Rizkin et al. |
| 6,227,682 B1 * | 5/2001 | Li .............................. 362/293 |

FOREIGN PATENT DOCUMENTS

| EP | 0401351 | 9/1993 | |
| WO | WO 01/02774 A1 * | 1/2001 | ............. F21V/8/00 |
| WO | WO 0173487 A2 | 10/2001 | |

* cited by examiner

Primary Examiner—Sandra O'Shea
Assistant Examiner—Ismael Negron
(74) Attorney, Agent, or Firm—Rothwell, Figg, Ernst & Manbeck, p.c.

(57) ABSTRACT

An optical device for increasing the brightness of electromagnetic radiation emitted by a source by folding the electromagnetic radiation back on itself. The source of electromagnetic radiation has a first width, a first input end of a first light pipe has a second width, and a second input end of a second light pipe has a third width. An output end of the first light pipe may be reflective, while an output end of the second light pipe may be transmissive. The source is located substantially proximate to a first focal point of a first reflector to produce rays of radiation that reflect from the first reflector to a second reflector and substantially converge at a second focal point; and the input ends of the first and second light pipes are located proximate to the second focal point to collect the electromagnetic radiation.

78 Claims, 8 Drawing Sheets

FOLDING AN ARC INTO ITSELF TO INCREASE THE BRIGHTNESS OF AN ARC LAMP

CROSS-REFERENCE TO RELATED APPLICATIONS

This application claims priority to Provisional Application Ser. No. 60/243,280, filed Oct. 26, 2000, the disclosure of which is incorporated by reference.

BACKGROUND OF THE INVENTION

1. Field of the Invention

This invention relates to increasing the brightness of an arc lamp by folding the arc back into itself.

2. Description of the Related Art

U.S. patent application Ser. No. 09/604,921, the disclosure of which is incorporated by reference, describes a dual-paraboloid reflector system that may be used to couple light from an arc lamp into a target such as a standard waveguide, e.g., a single fiber or fiber bundle, or output electromagnetic radiation to the homogenizer of a projector. This optical collection and condensing system, as illustrated in FIG. 1, uses two generally symmetric paraboloid reflectors 10, 11 that are positioned so that light reflected from the first reflector 10 is received in a corresponding section of the second reflector 11. In particular, light emitted from a light source 12, such as an arc lamp, is collected by the first parabolic reflector 10 and collimated along the optical axis toward the second reflector 11. The second reflector 11 receives the collimated beam of light and focuses this light at the target 13 positioned at the focal point.

The optical system of FIG. 1 may employ a retro-reflector 14 in conjunction with the first paraboloid reflector 10 to capture radiation emitted by the light source 12 in a direction away from the first paraboloid reflector 10 and reflect the captured radiation back through the light source 12. In particular, the retro-reflector 14 has a generally spherical shape with a focus located substantially near the light source 12 (i.e., at the focal point of the first paraboloid reflector) toward the first paraboloid reflector to thereby increase the intensity of the collimated rays reflected therefrom.

U.S. application Ser. No. 09/669,841, the disclosure of which is incorporated by reference, describes a dual ellipsoidal reflector system that may be used to couple light from an arc lamp into a target. This optical collection and condensing system, as illustrated in FIG. 2, uses two generally symmetric ellipsoid reflectors 20, 21 that are positioned so that light reflected from the first reflector 20 is received in a corresponding section of the second reflector 21. In particular, light emitted from the light source 22 is collected by the first elliptical reflector 20 and collimated along the optical axis 25 toward the second reflector 21. The second reflector 21 receives the collimated beam of light and focuses this light at the target 23 positioned at the focal point.

The objective of the above-described systems that collect, condense, and couple electromagnetic radiation into a target is to maximize the brightness of the electromagnetic radiation at the target. These systems must be efficient and have relatively long useful lives.

Arc lamps, e.g., metal halide lamps, xenon lamps, or high pressure mercury lamps, are often used in the above-mentioned systems as sources of light. One of the means by which high brightness may be obtained is by making the arc gap in the lamp small such that all the light is emitted from a small spot. An ideal source is a point source, in which the distance between the electrodes is negligible. There are practical limitations, however, to reducing the distance between the electrodes below a certain value. Among the limitations associated with a shorter arc are a loss of emission efficiency and reduced electrode life. The useful lives of the electrodes will be shorter with the shorter arc.

Since arc lamp gaps cannot be reduced indefinitely, there remains a need to increase the brightness of the electromagnetic radiation emitted by arc lamps with longer gaps for coupling into a target.

SUMMARY

An optical device is provided for increasing the brightness of electromagnetic radiation emitted by a source and coupled into a target by folding the electromagnetic radiation back on itself. The optical device includes the source of electromagnetic radiation, which has a first width; a first light pipe with a first input end and a reflective end, the first input end having a second width; a second light pipe disposed parallel to the first light pipe, the second light pipe further having a second input end juxtaposed to the first input end of the first light pipe and an output end, the second input end having a third width; a first reflector having a first optical axis and a first focal point on the first optical axis; and a second reflector having a second optical axis and a second focal point on the second optical axis disposed substantially symmetrically to the first reflector such that the first optical axis is substantially collinear with the second optical axis. The source is located substantially proximate to the first focal point of the first reflector to produce rays of radiation that reflect from the first reflector to the second reflector and substantially converge at the second focal point; and the input ends of the first and second light pipes are located proximate to the second focal point of the second reflector to collect the electromagnetic radiation. The first width is substantially equal to or smaller than the sum of the second and the third widths.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
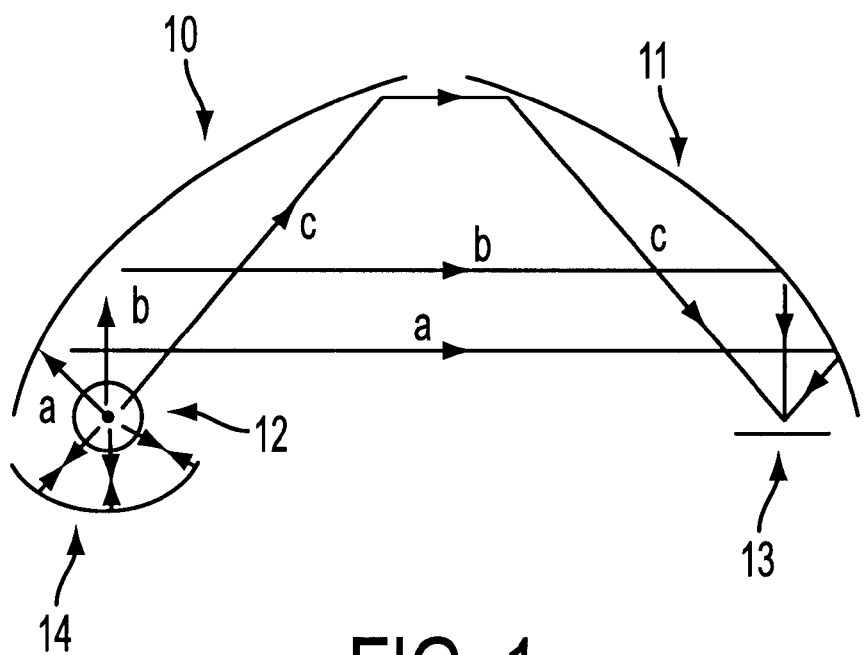
FIG. 1 is a schematic diagram of a collecting and condensing apparatus using paraboloid reflectors for use with an embodiment of the invention.
Figure 2:
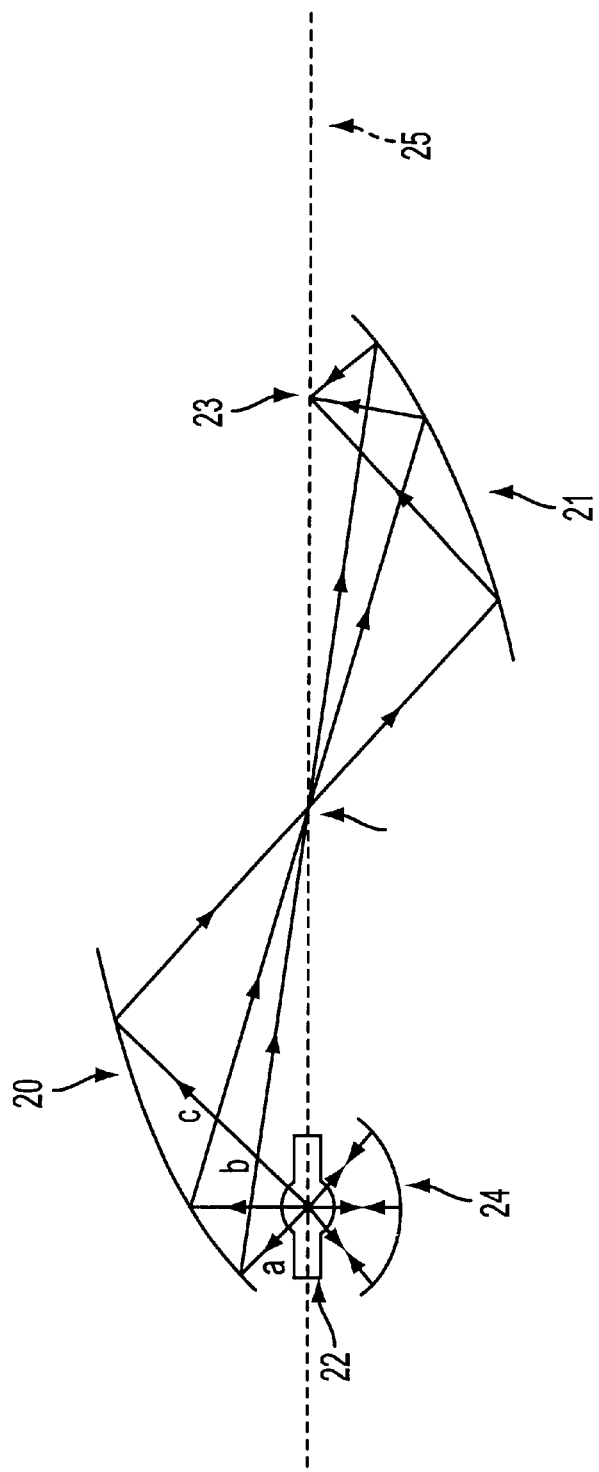
FIG. 2 is a schematic diagram of a collecting and condensing apparatus using ellipsoid reflectors for use with an embodiment of the invention.
Figure 3:
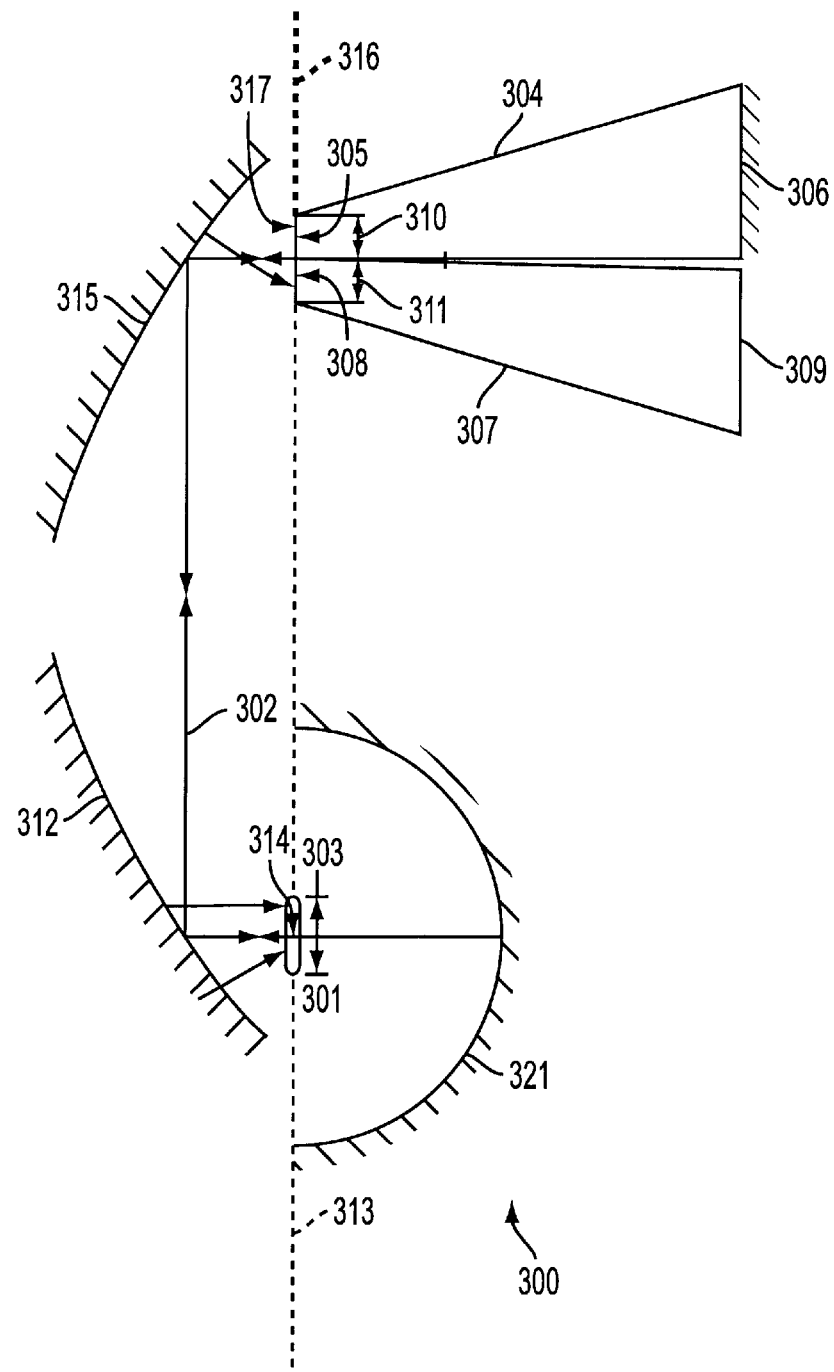
FIG. 3 is a schematic diagram of an optical device for folding electromagnetic radiation emitted by a source back on itself according to a first embodiment of the invention.

In FIG. 3 is shown a first embodiment of a collecting and condensing apparatus 300. The apparatus includes a source 301 of electromagnetic radiation 302 having a first width 303. In a preferred embodiment, source 301 is a light-emitting arc lamp. Source 301 may be, e.g., a xenon lamp, a metal halide lamp, an HID lamp, or a mercury lamp. Source 301 may be, in the alternative, a filament lamp.

If source 301 were an arc lamp, width 303 would be the linear distance between its electrodes, for an AC lamp, or between its anode and its cathode, for a DC lamp. If source 301 were a filament lamp, first width 303 would be the hot length of the filament, e.g. between the leads.

Figure 4A:
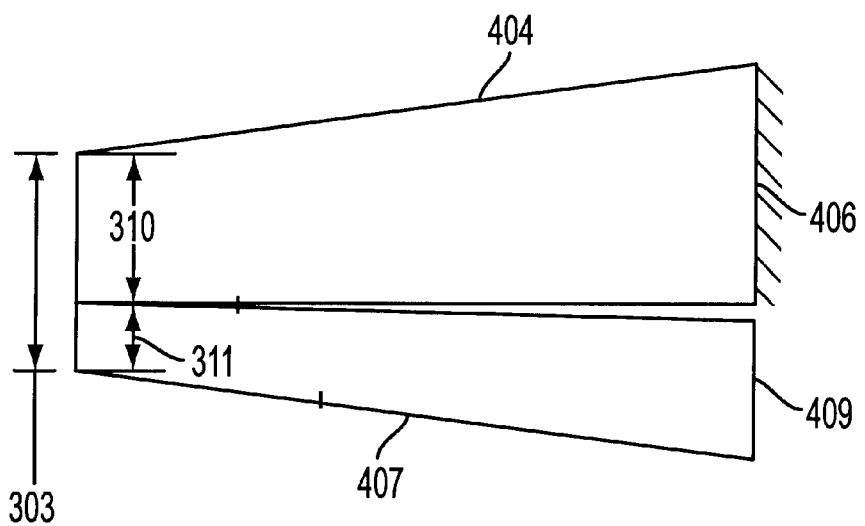
FIG. 4(a) is a detail of the light pipes shown in the embodiment of FIG. 3.
Figure 4B:
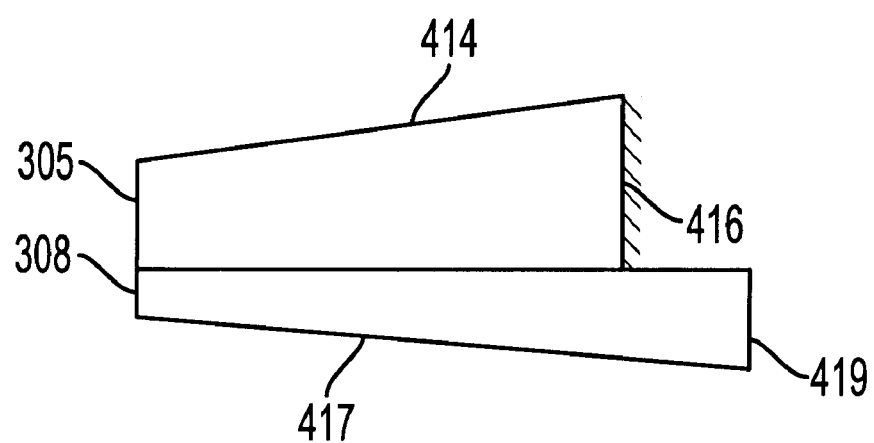
FIG. 4(b) is an embodiment of the light pipes shown in FIG. 4(a) with different lengths.

A first light pipe 304 with a first input end 305 and a reflective end 306 is disposed parallel to a second light pipe 307 with a second input end 308 and an output end 309. First input end 305 and second input end 308 are juxtaposed. Reflective end 406 and output end 409 may also be juxtaposed, if, e.g., first light pipe 404 and second light pipe 407 are of similar lengths, as shown in FIG. 4(a), although this is not strictly necessary. Light pipe 417 can be, e.g., longer than light pipe 414, as shown in FIG. 4(b). The first input end 305 has a second width 310, while the second input end 308 has a third width 311.

If first light pipe 304 and second light pipe 307 have substantially rectangular cross-sections, then second width 310 and third width 311 are dimensions of first input end 305 and second input end 308, respectively, measured in a particular direction. In a preferred embodiment, first light pipe 304 and second light pipe 307 are both substantially tapered light pipes. First light pipe 304 and second light pipe 307 may be made of, e.g., quartz, glass, plastic, or acrylic.

A first reflector 312 having a first optical axis 313 and a first focal point 314 on first optical axis 313 is placed substantially symmetrically to a second reflector 315 having a second optical axis 316 and a second focal point 317. First optical axis 313 is substantially collinear with second optical axis 316. There is a plane of symmetry with respect to first and second reflectors 312 and 315 that is normal to optical axes 313 and 316. Thus second reflector 315 may be formed by mirroring first reflector 312 through the plane of symmetry.

In one embodiment, first and second reflectors 312 and 315 have a coating that reflects only a pre-specified portion of the electromagnetic radiation spectrum. In a preferred embodiment, the coating only reflects visible light radiation, a pre-specified band of radiation, or a specific color of radiation.

In a preferred embodiment, first and second reflectors 312 and 315 are each at least a portion of a substantially paraboloidal surface of revolution. In other, less preferred embodiments, first and second reflectors 312 and 315 are each at least a portion of a substantially toroidal, spheroidal, hyperboloidal, or ellipsoidal surface of revolution.

Source 301 is located substantially proximate to first focal point 314 of first reflector 312 to produce rays of radiation 302 that reflect from first reflector 312 to second reflector 315 and substantially converge at second focal point 316. First and second input ends 305 and 308 are located substantially proximate to second focal point 317 of second reflector 315 to collect electromagnetic radiation 302. Since first input end 305 and second input end 308 are juxtaposed, second width 310 and third width 311 may be oriented end-to-end, such that they form a line. The line along which second width 310 and third width 311 are oriented may be substantially parallel to first width 303, i.e. the direction from one electrode of source 301 to the other.

In a preferred embodiment, first width 303 is substantially equal to the sum of second width 310 and third width 311.

First width 303, however, may be smaller or larger than the sum of second width 310 and third width 311, albeit with reduced efficiency. As shown in FIG. 4(a), second width 310 and third width 311 may be in any ratio, as long as their sum equals substantially first width 303. Second width 310 may be, e.g., substantially equal to third width 311, or second width 310 may be substantially equal to twice third width 311.

A portion of the electromagnetic radiation 302 emitted by source 301 impinges directly on first reflector 312 and a portion of the electromagnetic radiation 302 does not impinge directly on first reflector 312. To collect the electromagnetic radiation 302 that does not impinge directly on first reflector 312, system 300 includes an additional reflector 321 constructed and arranged to reflect at least part of the portion of the electromagnetic radiation 302 that does not impinge directly on first reflector 312 toward first reflector 312 through first focal point 314 of first reflector 312 to increase the flux intensity of the converging rays.

In a preferred embodiment, additional reflector 321 is a spherical retro-reflector disposed on a side of source 301 opposite first reflector 312 to reflect electromagnetic radiation 302 emitted from source in a direction away from first reflector 312 toward first reflector 312 through the first focal point 314 of first reflector 312.

Since first input end 305 and second input end 308 are juxtaposed at second focal point 316, rays of radiation 302 converging on first input end 305 and second input end 308 will have approximately the same dimensions as the rays of radiation 302 emitted from source 301. Since first width 303 is substantially equal to the sum of second width 310 and third width 311, rays of radiation 302 will be distributed to first input end 305 and second input end 308 in proportion to the ratio of second width 310 to third width 311. Thus, a portion of rays of radiation 302 will be coupled into first light pipe 304, while the balance will be coupled into second light pipe 307.

The portion of rays of radiation 302 coupled into second light pipe 307 will travel through second light pipe 307 and emerge from output end 309. Meanwhile, the portion of rays of radiation 302 coupled into first light pipe 304 will be reflected at reflective end 306 and re-transmitted through first light pipe 304, emerging at first input end 305. The rays emergent from first input end 305 will be reflected by second reflector 315 toward first reflector 312, converging at first focal point 314. These convergent rays will then pass through the arc gap to be reflected in turn by additional reflector 321 toward first reflector 312, rejoining the other rays on their way to be coupled into the target. Some of this radiation will be coupled into second light pipe 307 and emerge from output end 309. Thus, the rays of radiation 302 emitted by source 301 with an arc gap of first width 303 end up being focused on a spot smaller than first width 303.

Figure 5:
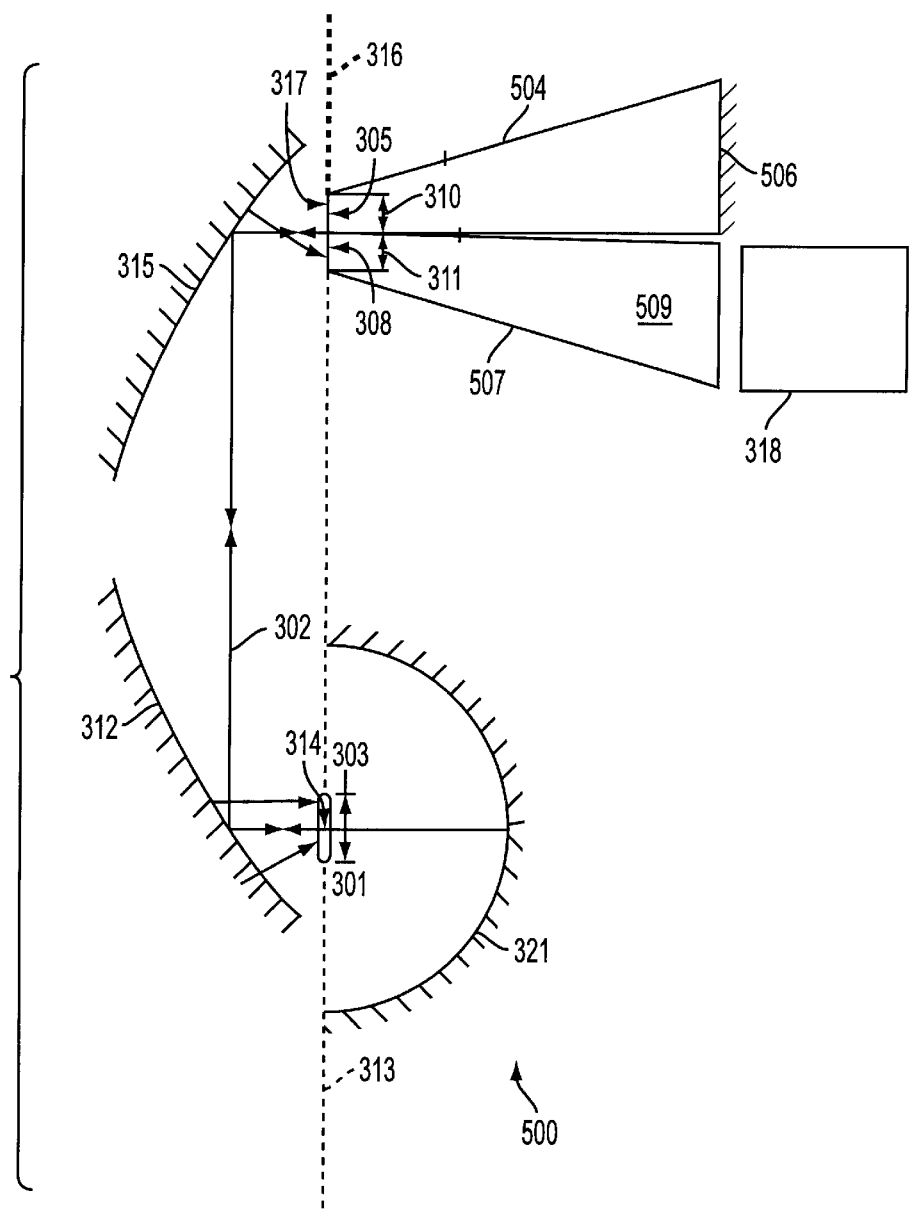
FIG. 5 is the embodiment shown in FIG. 3 outputting to a waveguide.

In an alternative embodiment, shown in FIG. 5, a waveguide 318 may be disposed substantially proximate to output end 509 of second light pipe 507. Waveguide 318 may be, e.g., a single core optic fiber, a fiber bundle, a fused fiber bundle, a polygonal rod, a hollow reflective light pipe, or a homogenizer. A cross-section of waveguide 318 may be that of a circular waveguide, a polygonal waveguide, a tapered waveguide or a combinations thereof. In another alternative embodiment, waveguide 318 may be a fiber optic.

Figure 6:
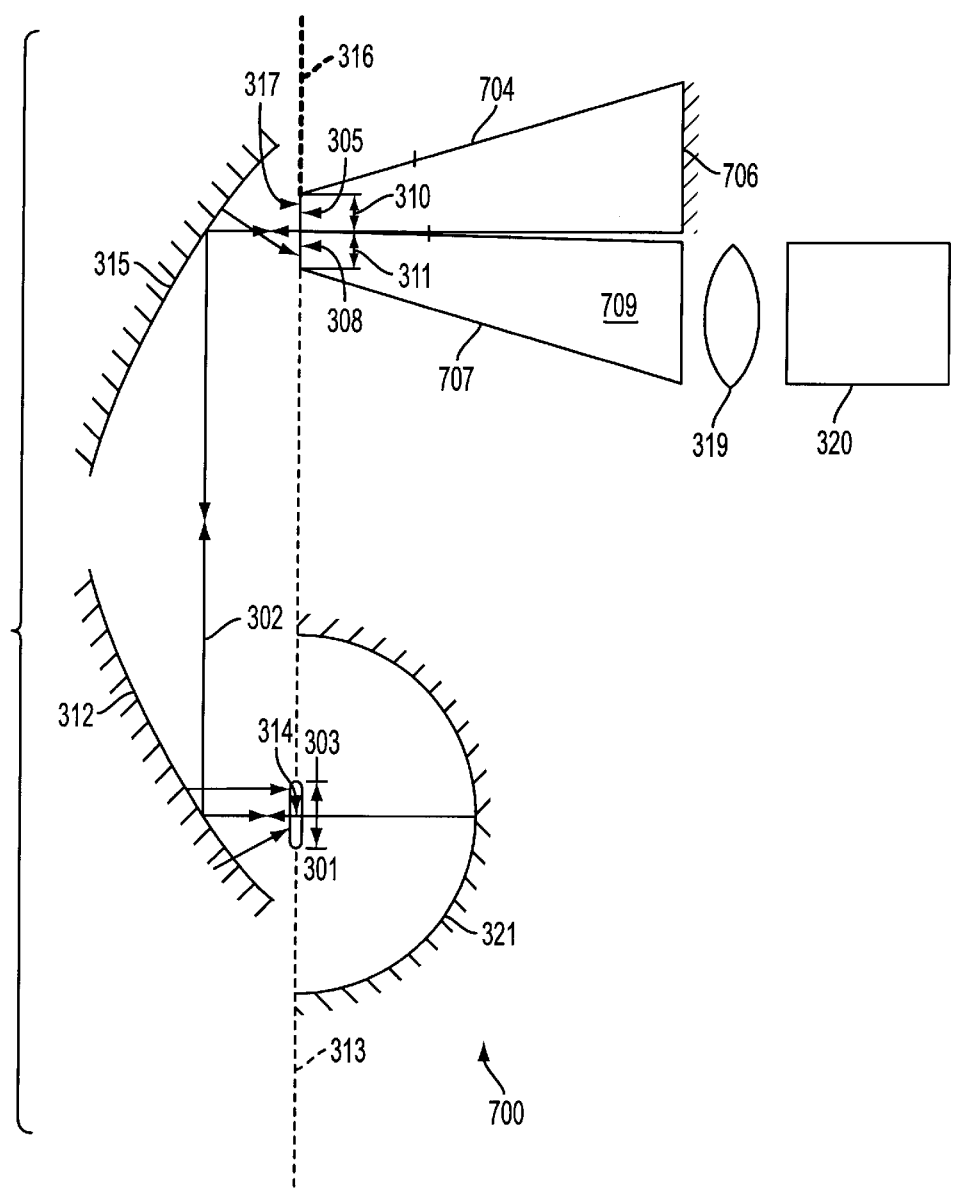
FIG. 6 is the embodiment shown in FIG. 3 outputting to a projection system.

In another alternative embodiment, shown in FIG. 6, a condenser lens 319 may be disposed substantially proximate to output end 709 of second light pipe 707. An image projection system 320 may be disposed substantially proximate to an output side of condenser lens 319 to illuminate an image by releasing the collected and condensed radiation to display the image.

Figure 7:
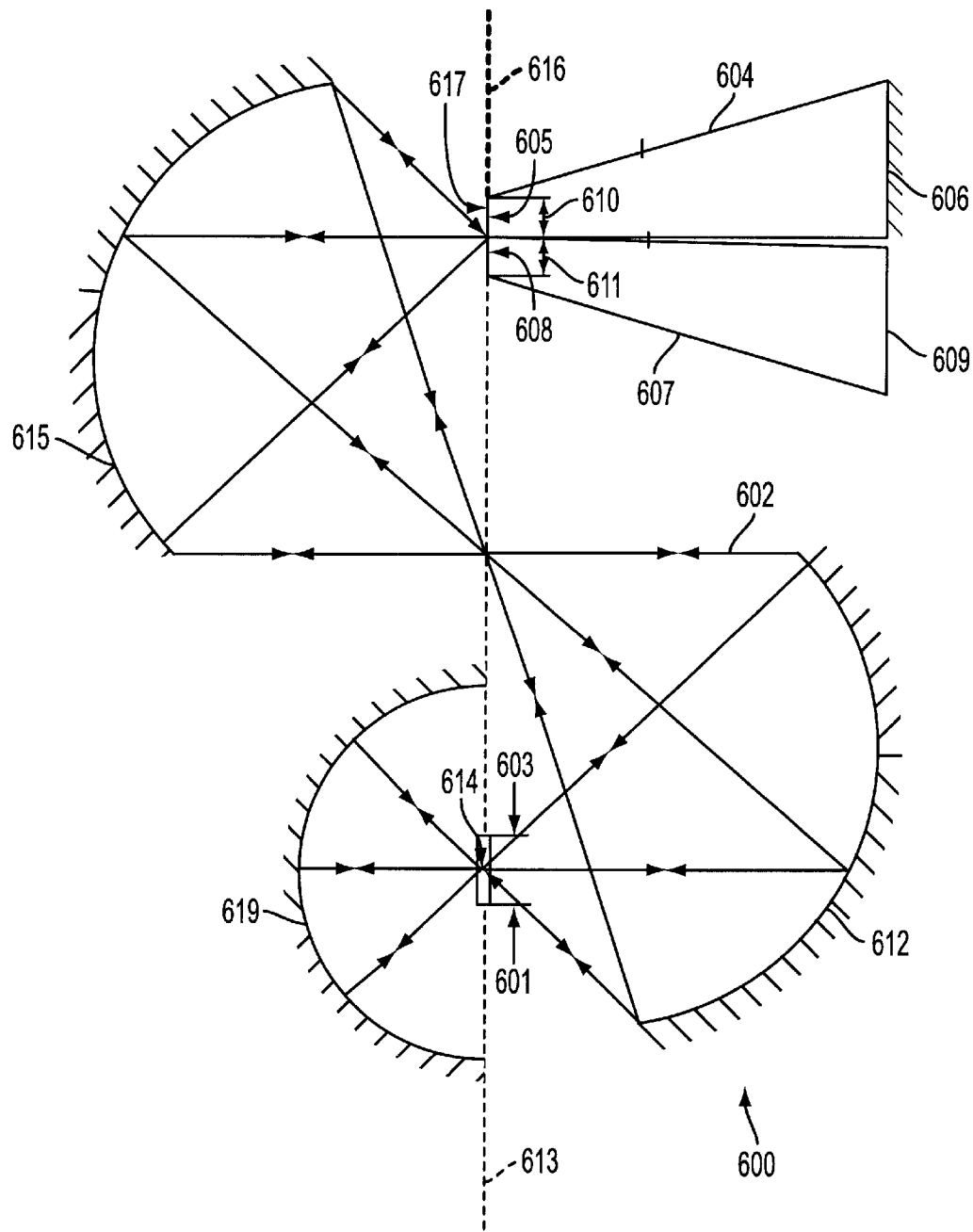
FIG. 7 is a schematic diagram of an optical device for folding electromagnetic radiation emitted by a source back on itself according to a second embodiment of the invention.

In FIG. 7 is shown a second embodiment of a collecting and condensing apparatus 600. Collecting and condensing apparatus 600 is similar to collecting and condensing apparatus 300 with the exception of the orientation and generating curve of the reflectors.

A first reflector 612 having a first optical axis 613 and a first focal point 614 on first optical axis 613 is placed substantially symmetrically to a second reflector 615 having a second optical axis 616 and a second focal point 617. First optical axis 613 is substantially collinear with second optical axis 616. There are two planes of symmetry, one of which is normal to optical axes 613 and 616, while the other is normal to the first plane of symmetry and contains optical axes 613 and 616. First reflector 612 is thus substantially symmetrical to second reflector 615 in that first reflector 612 is just second reflector 615 mirrored through the two planes of symmetry, in either order.

In a preferred embodiment, first and second reflectors 612 and 615 are each at least a portion of a substantially ellipsoidal surface of revolution. In other, less preferred embodiments, first and second reflectors 612 and 615 are each at least a portion of a substantially toroidal, spheroidal, or paraboloidal surfaces of revolution.

Since first input end 605 and second input end 608 are juxtaposed at second focal point 616, rays of radiation 602 converging on first input end 605 and second input end 608 will have approximately the same dimensions as the rays of radiation 602 emitted from source 601. Since first width 603 is substantially equal to the sum of second width 610 and third width 611, rays of radiation 602 will be distributed to first input end 605 and second input end 608 in proportion to the ratio of second width 610 to third width 611. Thus, a portion of rays of radiation 602 will be coupled into first light pipe 604, while the balance will be coupled into second light pipe 607.

The portion of rays of radiation 602 coupled into second light pipe 607 will travel through second light pipe 607 and emerge from output end 609. Meanwhile, the portion of rays of radiation 602 coupled into first light pipe 604 will be reflected at reflective end 606 and re-transmitted through first light pipe 604, emerging at first input end 605. The rays emergent from first input end 605 will be reflected by second reflector 615 toward first reflector 612, converging at first focal point 614. These convergent rays will then pass through the arc gap to be reflected in turn by additional reflector 619 toward first reflector 612, rejoining the other rays on their way to be coupled into the target. Some of this radiation will be coupled into second light pipe 607 and emerge from output end 609. Thus, the rays of radiation 602 emitted by source 601 with an arc gap of first width 603 end up being focused on a spot smaller than first width 603.

A method of folding electromagnetic radiation emitted by a source back on itself to increase the brightness of the source is as follows. A source of electromagnetic radiation having a first width is positioned at a focal point of a first reflector. Rays of radiation are produced by the source. The rays of radiation are reflected by the first reflector toward a second reflector. The rays of radiation converge at a focal point of the second reflector. A first light pipe having a first input end and a reflective end, the first input end further having a second width, and a second light pipe having an second input end and an output end, the second input end further having a third width, is positioned such that the first and second input ends are substantially proximate to the focal point of the second reflector, and such that the first width is substantially equal to a sum of the second and third widths. The rays of radiation reflected by the second reflector pass through the first and second input ends of the first and second light pipes, in substantial proportion to the ratio of the second width to the third width. Rays of radiation passing through the second light pipe are output. Rays of radiation passing through the first light pipe are reflected back toward the second and first reflectors, to said source.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A collecting and condensing apparatus comprising:
    a source of electromagnetic radiation, said source having a first width;
    a first light pipe, said first light pipe having a first input end and a reflective end, said input end having a second width;
    a second light pipe disposed parallel to said first light pipe, said second light pipe further having an second input end juxtaposed to said first input end of said first light pipe and an output end, said second input end having a third width;
    a first reflector having a first optical axis and a first focal point on said first optical axis;
    a second reflector having a second optical axis and a second focal point on said second optical axis disposed substantially symmetrically to said first reflector such that said first optical axis is substantially collinear with said second optical axis;
    said source being located substantially proximate to said first focal point of said first reflector to produce rays of radiation that reflect from said first reflector to said second reflector and substantially converge at said second focal point;
    an additional reflector constructed and arranged to reflect at least part of a portion of the electromagnetic radiation that does not impinge directly on said first reflector toward said first reflector through the first focal point of said first reflector to increase a flux intensity of the converging rays; and
    wherein said first and second input ends of said light pipes are located substantially proximate to said second focal point of said second reflector to collect said electromagnetic radiation.

2. The collecting and condensing apparatus of claim 1, wherein said first width is substantially equal to the sum of said second and said third widths.

3. The collecting and condensing apparatus of claim 1, wherein said first width is smaller than the sum of said second and said third widths.

4. The collecting and condensing apparatus of claim 1, wherein said first width is larger than the sum of said second and said third widths.

5. The collecting and condensing apparatus of claim 1, wherein said second width is substantially equal to said third width.

6. The collecting and condensing apparatus of claim 1, wherein said second width is substantially twice said third width.

7. The collecting and condensing apparatus of claim 1, wherein said first and said second light pipes comprise substantially tapered light pipes.

8. The collecting and condensing apparatus of claim 1, wherein said first and second reflectors comprise at least a portion of a substantially ellipsoidal surface of revolution.

9. The collecting and condensing apparatus of claim 1, wherein said first and second reflectors comprise at least a portion of a substantially toroidal surface of revolution.

10. The collecting and condensing apparatus of claim 1, wherein said first and second reflectors comprise at least a portion of a substantially spheroidal surface of revolution.

11. The collecting and condensing apparatus of claim 1, wherein said first and second reflectors comprise at least a portion of a substantially paraboloidal surface of revolution.

12. The collecting and condensing apparatus of claim 1, wherein:
said first reflector comprises at least a portion of a substantially ellipsoidal surface of revolution; and
said second reflector comprises at least a portion of a substantially hyperboloidal surface of revolution.

13. The collecting and condensing apparatus of claim 1, wherein:
said first reflector comprises at least a portion of a substantially hyperboloidal surface of revolution; and
said second reflector comprises at least a portion of a substantially ellipsoidal surface of revolution.

14. The collecting and condensing apparatus of claim 1, wherein said additional reflector comprises a spherical retro-reflector disposed on a side of said source opposite said first reflector to reflect electromagnetic radiation emitted from said source in a direction away from said first reflector toward said first reflector through the first focal point of said first reflector.

15. The collecting and condensing apparatus of claim 1, wherein said source comprises a filament lamp.

16. The collecting and condensing apparatus of claim 1, wherein said first and second light pipes are comprised of a material selected from the group consisting of quartz, glass, plastic, or acrylic.

17. The collecting and condensing apparatus of claim 1, further comprising a fiber optic, the fiber optic being illuminated by the radiation transmitted at said output end of said second light pipe, the fiber optic releasing the collected and condensed radiation to provide for illumination at a desired location.

18. The collecting and condensing apparatus of claim 1, further comprising:
a condenser lens disposed substantially proximate to said output end of said second light pipe;
an image projection system disposed substantially proximate to an output side of said condenser lens;
an image being illuminated by the radiation collected and condensed at said optical coupling element, the projection system releasing the collected and condensed radiation to display the image.

19. The collecting and condensing apparatus of claim 1, wherein said first and second reflectors have a coating that reflects only a pre-specified portion of the electromagnetic radiation spectrum.

20. The collecting and condensing apparatus of claim 19, wherein said coating only reflects visible light radiation, a pre-specified band of radiation, or a specific color of radiation.

21. The collecting and condensing apparatus of claim 1, wherein said source comprises a light-emitting arc lamp.

22. The collecting and condensing apparatus of claim 21, wherein said arc lamp comprises a lamp selected from the group comprising a xenon lamp, a metal halide lamp, an HID lamp, a mercury lamp, or a high-pressure mercury lamp.

23. The collecting and condensing apparatus of claim 1, further comprising a waveguide disposed substantially proximate to said output end of said second light pipe, said waveguide selected from the group consisting of a single core optic fiber, a fiber bundle, a fused fiber bundle, a polygonal rod, a hollow reflective light pipe, or a homogenizer.

24. The collecting and condensing apparatus of claim 23, wherein a cross-section of said waveguide is selected from the group consisting of circular waveguides, polygonal waveguides, tapered waveguides and combinations thereof.

25. A system for collecting and condensing electromagnetic radiation comprising:
a source of electromagnetic radiation, said source having a first width;
a first light pipe, said first light pipe having a first input end and a reflective end, said first input end having a second width;
a second light pipe disposed parallel to said first light pipe, said second light pipe further having a second input end juxtaposed to said first input end of said first light pipe and an output end, said second input end having a third width;
a first reflector having a first optical axis and a first focal point on said first optical axis;
a second reflector having a second optical axis and a second focal point on said second optical axis disposed substantially symmetrically to said first reflector such that said first optical axis is substantially collinear with said second optical axis;
said source being located substantially proximate to said first focal point of said first reflector to produce rays of radiation that reflect from said first reflector to said second reflector and substantially converge at said second focal point;
an additional reflector constructed and arranged to reflect at least part of the portion of the electromagnetic radiation that does not impinge directly on said first reflector toward said first reflector through the first focal point of said first reflector to increase the flux intensity of the converging rays; and
wherein said first and second input ends of said light pipes are located substantially proximate to said second focal point of said second reflector to collect said electromagnetic radiation.

26. The system for collecting and condensing electromagnetic radiation of claim 25, wherein said first width is substantially equal to the sum of said second and said third widths.

27. The system for collecting and condensing electromagnetic radiation of claim 25, wherein said first width is smaller than the sum of said second and said third widths.

28. The system for collecting and condensing electromagnetic radiation of claim 25, wherein said first width is larger than the sum of said second and said third widths.

29. The system for collecting and condensing electromagnetic radiation of claim 25, wherein said second width is substantially equal to said third width.

30. The system for collecting and condensing electromagnetic radiation of claim 25, wherein said second width is substantially twice said third width.

31. The system for collecting and condensing electromagnetic radiation of claim 25, wherein said first and said second light pipes comprise tapered light pipes.

32. The system for collecting and condensing electromagnetic radiation of claim 25, wherein said first and second reflectors comprise at least a portion of a substantially ellipsoidal surface of revolution.

33. The system for collecting and condensing electromagnetic radiation of claim 25, wherein said first and second reflectors comprise at least a portion of a substantially toroidal surface of revolution.

34. The system for collecting and condensing electromagnetic radiation of claim 25, wherein said first and second reflectors comprise at least a portion of a substantially spheroidal surface of revolution.

35. The system for collecting and condensing electromagnetic radiation of claim 25, wherein said first and second reflectors comprise at least a portion of a substantially paraboloidal surface of revolution.

36. The system for collecting and condensing electromagnetic radiation of claim 25, wherein:
said first reflector comprises at least a portion of a substantially ellipsoidal surface of revolution; and
said second reflector comprises at least a portion of a substantially hyperboloidal surface of revolution.

37. The system for collecting and condensing electromagnetic radiation of claim 25, wherein:
said first reflector comprises at least a portion of a substantially hyperboloidal surface of revolution; and
said second reflector comprises at least a portion of a substantially ellipsoidal surface of revolution.

38. The system for collecting and condensing electromagnetic radiation of claim 25, wherein said additional reflector comprises a spherical retro-reflector disposed on a side of said source opposite said first reflector to reflect electromagnetic radiation emitted from said source in a direction away from said first reflector toward said first reflector through the first focal point of said first reflector.

39. The system for collecting and condensing electromagnetic radiation of claim 25, wherein said source comprises a filament lamp.

40. The system for collecting and condensing electromagnetic radiation of claim 25, wherein said first and second light pipes are comprised of a material selected from the group consisting of quartz, glass, plastic, or acrylic.

41. The system for collecting and condensing electromagnetic radiation of claim 25, further comprising a fiber optic, the fiber optic being illuminated by the radiation transmitted at said output end of said second light pipe, the fiber optic releasing the collected and condensed radiation to provide for illumination at a desired location.

42. The system for collecting and condensing electromagnetic radiation of claim 25, further comprising:
a condenser lens disposed substantially proximate to said output end of said second light pipe;
an image projection system disposed substantially proximate to an output side of said condenser lens;
an image being illuminated by the radiation collected and condensed at said optical coupling element, the projection system releasing the collected and condensed radiation to display the image.

43. The system for collecting and condensing electromagnetic radiation of claim 25, wherein said first and second reflectors have a coating that reflects only a pre-specified portion of the electromagnetic radiation spectrum.

44. The system for collecting and condensing electromagnetic radiation of claim 43, wherein said coating only reflects visible light radiation, a pre-specified band of radiation, or a specific color of radiation.

45. The system for collecting and condensing electromagnetic radiation of claim 25, wherein said source comprises a light-emitting arc lamp.

46. The system for collecting and condensing electromagnetic radiation of claim 45, wherein said arc lamp comprises a lamp selected from the group comprising a xenon lamp, a metal halide lamp, an HID lamp, a mercury lamp, or a high-pressure mercury lamp.

47. The system for collecting and condensing electromagnetic radiation of claim 25, further comprising a waveguide disposed substantially proximate to said output end of said second light pipe, said waveguide selected from the group consisting of a single core optic fiber, a fiber bundle, a fused fiber bundle, a polygonal rod, a hollow reflective light pipe, or a homogenizer.

48. The system for collecting and condensing electromagnetic radiation of claim 47, wherein a cross-section of said waveguide is selected from the group consisting of circular waveguides, polygonal waveguides, tapered waveguides and combinations thereof.

49. An optical device for folding electromagnetic radiation emitted by a source back on itself to increase the brightness of the source, said device comprising:
said source of electromagnetic radiation, said source having a first width;
a first light pipe, said first light pipe having a first input end and a reflective end, said first input end having a second width;
a second light pipe disposed parallel to said first light pipe, said second light pipe further having a second input end juxtaposed to said first input end of said first light pipe, and an output end, said second input end having a third width;
a first reflector having a first optical axis and a first focal point on said first optical axis;
a second reflector having a second optical axis and a second focal point on said second optical axis disposed substantially symmetrically to said first reflector such that said first optical axis is substantially collinear with said second optical axis;
said source being located substantially proximate to said first focal point of said first reflector to produce rays of radiation that reflect from said first reflector to said second reflector and substantially converge at said second focal point;
an additional reflector constructed and arranged to reflect at least part of the portion of the electromagnetic radiation that does not impinge directly on said first reflector toward said first reflector through the first focal point of said first reflector to increase the flux intensity of the converging rays; and
wherein said input ends of said first and second light pipes are located substantially proximate to said second focal point of said second reflector to collect said electromagnetic radiation.

50. The optical device of claim 49, wherein said first width is substantially equal to the sum of said second and said third widths.

51. The optical device of claim 49, wherein said first width is smaller than the sum of said second and said third widths.

52. The optical device of claim 49, wherein said first width is larger than the sum of said second and said third widths.

53. The optical device of claim 49, wherein said second width is substantially equal to said third width.

54. The optical device of claim 49, wherein said second width is substantially twice said third width.

55. The optical device of claim 49, wherein said first and said second light pipes comprise substantially tapered light pipes.

56. The optical device of claim 49, wherein said first and second reflectors comprise at least a portion of a substantially ellipsoidal surface of revolution.

57. The optical device of claim 49, wherein said first and second reflectors comprise at least a portion of a substantially toroidal surface of revolution.

58. The optical device of claim 49, wherein said first and second reflectors comprise at least a portion of a substantially spheroidal surface of revolution.

59. The optical device of claim 49, wherein said first and second reflectors comprise at least a portion of a substantially paraboloidal surface of revolution.

60. The optical device of claim 49, wherein:
said first reflector comprises at least a portion of a substantially ellipsoidal surface of revolution; and
said second reflector comprises at least a portion of a substantially hyperboloidal surface of revolution.

61. The optical device of claim 49, wherein:
said first reflector comprises at least a portion of a substantially hyperboloidal surface of revolution; and
said second reflector comprises at least a portion of a substantially ellipsoidal surface of revolution.

62. The optical device of claim 49, wherein a portion of the electromagnetic radiation emitted by said source of electromagnetic radiation impinges directly on said first reflector and a portion of the electromagnetic radiation does not impinge directly on said first reflector and wherein said system further comprises an additional reflector constructed and arranged to reflect at least part of the portion of the electromagnetic radiation that does not impinge directly on said first reflector toward said first reflector through the first focal point of said first reflector to increase the flux intensity of the converging rays.

63. The optical device of claim 49, wherein said additional reflector comprises a spherical retro-reflector disposed on a side of said source opposite said first reflector to reflect electromagnetic radiation emitted from said source in a direction away from said first reflector toward said first reflector through the first focal point of said first reflector.

64. The optical device of claim 49, wherein said source comprises a filament lamp.

65. The optical device of claim 49, wherein said first and second light pipes are comprised of a material selected from the group consisting of quartz, glass, plastic, or acrylic.

66. The optical device of claim 49, further comprising a fiber optic, the fiber optic being illuminated by the radiation transmitted at said output end of said second light pipe, the fiber optic releasing the collected and condensed radiation to provide for illumination at a desired location.

67. The optical device of claim 49, further comprising:
a condenser lens disposed substantially proximate to said output end of said second light pipe;
an image projection system disposed substantially proximate to an output side of said condenser lens;
an image being illuminated by the radiation collected and condensed at said optical coupling element, the projection system releasing the collected and condensed radiation to display the image.

68. The optical device of claim 49, wherein said first and second reflectors have a coating that reflects only a pre-specified portion of the electromagnetic radiation spectrum.

69. The optical device of claim 68, wherein said coating only reflects visible light radiation, a pre-specified band of radiation, or a specific color of radiation.

70. The optical device of claim 49, wherein said source comprises a light-emitting arc lamp.

71. The optical device of claim 70, wherein said arc lamp comprises a lamp selected from the group comprising a xenon lamp, a metal halide lamp, an HID lamp, a mercury lamp, or a high pressure mercury lamp.

72. The optical device of claim 49, further comprising a waveguide disposed substantially proximate to said output end of said second light pipe, said waveguide selected from the group consisting of a single core optic fiber, a fiber bundle, a fused fiber bundle, a polygonal rod, a hollow reflective light pipe, or a homogenizer.

73. The optical device of claim 72, wherein a cross-section of said waveguide is selected from the group consisting of circular waveguides, polygonal waveguides, tapered waveguides and combinations thereof.

74. A method of folding electromagnetic radiation emitted by a source back on itself to increase the brightness of the source, the method comprising the steps of:
positioning said source of electromagnetic radiation at a focal point of a first reflector, said source having a first width;
producing rays of radiation by said source;
reflecting said rays of radiation by said first reflector toward a second reflector;
converging said rays of radiation at a focal point of said second reflector;
positioning a first light pipe having a first input end and a reflective end, said first input end further having a second width, and a second light pipe having an second input end and an output end, said second input end further having a third width, such that said first and second input ends are substantially proximate to the focal point of the second reflector, and wherein said first width is substantially equal to a sum of said second and third widths; and
passing the rays of radiation reflected by said second reflector through said first and second input ends of said first and second light pipes;
outputting rays of radiation passing through said second light pipe; and
reflecting rays of radiation passing through said first light pipe back toward said second and first reflectors, to said source.

75. The method of folding electromagnetic radiation emitted by a source back on itself of claim 74, wherein said first and second reflectors comprise at least a portion of a substantially paraboloidal surface of revolution.

76. The method of folding electromagnetic radiation emitted by a source back on itself of claim 74, wherein said first and second reflectors comprise at least a portion of a substantially ellipsoidal surface of revolution.

77. The method of folding electromagnetic radiation emitted by a source back on itself claim 74, wherein:
said first reflector comprises at least a portion of a substantially ellipsoidal surface of revolution; and
said second reflector comprises at least a portion of a substantially hyperboloidal surface of revolution.

78. The method of folding electromagnetic radiation emitted by a source back on itself claim 74, wherein:
said first reflector comprises at least a portion of a substantially hyperboloidal surface of revolution; and
said second reflector comprises at least a portion of a substantially ellipsoidal surface of revolution.

* * * * *